US007480262B2

(12) United States Patent
Horiuchi et al.

(10) Patent No.: US 7,480,262 B2
(45) Date of Patent: Jan. 20, 2009

(54) TELEPHONE TERMINAL, TELEPHONE SYSTEM USING TELEPHONE TERMINAL AND CONTROL METHOD OF TELEPHONE TERMINAL

(75) Inventors: Takeshi Horiuchi, Hachioji (JP); Yoshihiro Uto, Akishima (JP); Toshiaki Takahashi, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 659 days.

(21) Appl. No.: 11/239,313

(22) Filed: Sep. 30, 2005

(65) Prior Publication Data
US 2006/0067255 A1 Mar. 30, 2006

(30) Foreign Application Priority Data
Sep. 30, 2004 (JP) ............... 2004-288891

(51) Int. Cl.
*H04B 3/20* (2006.01)
(52) U.S. Cl. .................................... 370/286
(58) Field of Classification Search ............. 370/286
See application file for complete search history.

(56) References Cited

U.S. PATENT DOCUMENTS

| | | | | |
|---|---|---|---|---|
| 4,052,562 A | * | 10/1977 | Andersen | 370/282 |
| 5,297,198 A | * | 3/1994 | Butani et al. | 379/388.04 |
| 5,644,635 A | | 7/1997 | Armbruster | |
| 5,696,819 A | | 12/1997 | Suizu et al. | |
| 5,838,787 A | | 11/1998 | Ding et al. | |
| 5,982,755 A | * | 11/1999 | Forrester et al. | 370/278 |
| 6,377,679 B1 | | 4/2002 | Hashimoto et al. | |
| 6,404,887 B1 | | 6/2002 | Born et al. | |
| 6,810,025 B2 | * | 10/2004 | Chung | 370/286 |
| 2003/0058807 A1 | | 3/2003 | Hoffmann | |
| 2004/0131015 A1 | | 7/2004 | Sung et al. | |

FOREIGN PATENT DOCUMENTS

| | | |
|---|---|---|
| EP | 0 765 066 A2 | 3/1997 |
| GB | 2 389 287 A | 12/2003 |
| GB | 2 407 733 A | 5/2005 |

OTHER PUBLICATIONS

Combined Search and Examination Report issued by the British Patent Office, dated Dec. 22, 2005, for British Patent Application No. GB0518650.7.
Office Action dated Jun. 13, 2008, from Canadian Patent Office in Canadian Patent Application No. 2,519,827 (2 pages).

* cited by examiner

*Primary Examiner*—Ramnandan Singh
(74) *Attorney, Agent, or Firm*—Finnegan, Henderson, Farabow, Garrett & Dunner, L.L.P.

(57) ABSTRACT

A telephone terminal includes a receiving detector which detects a signal level of a receiving voice signal incoming from the main device, a transmitting detector which detects a signal level of a transmitting voice signal to transmit it to the main device, an adjustment device to adjust the transmitting voice signal and a controller which obtains a control value capable of switching a communication state from a receiving state to a transmitting state to make an acoustic echo to be added to the transmitting voice signal be minimum, based on each signal level of the receiving voice signal and signal level of the transmitting voice signal, and controls the adjustment device based on the control value.

8 Claims, 6 Drawing Sheets

| Sound volume dB | 10 | 8 | 6 | 4 | 2 | 0~-30 |
|---|---|---|---|---|---|---|
| Transmitting detection gain dB | -4 | -2 | 0 | 0 | 0 | 0 |
| | | | | | | |
FIG. 3
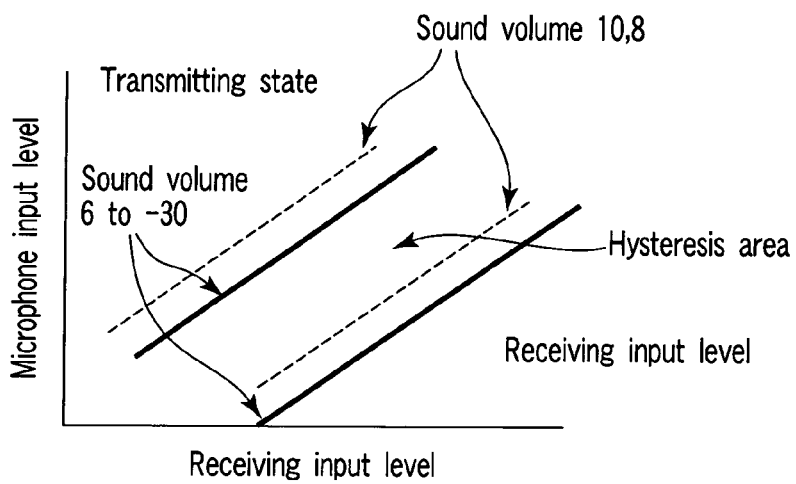
FIG. 4
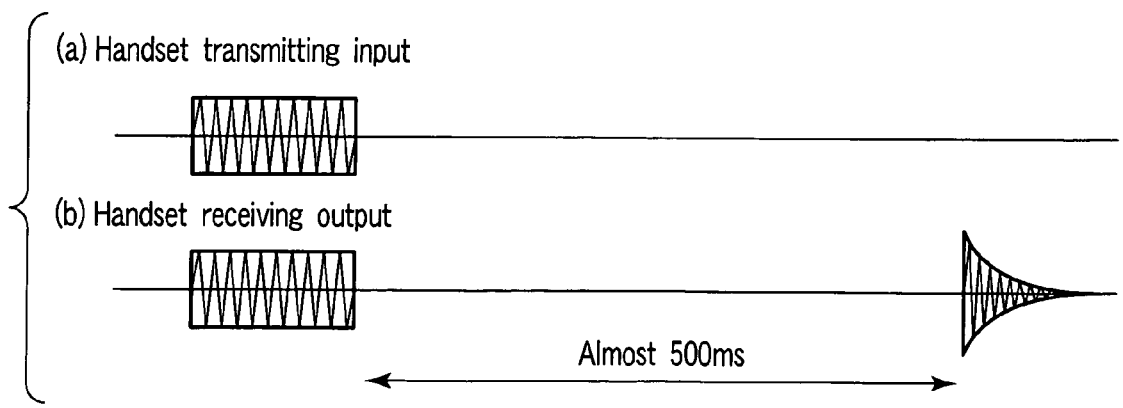
FIG. 5

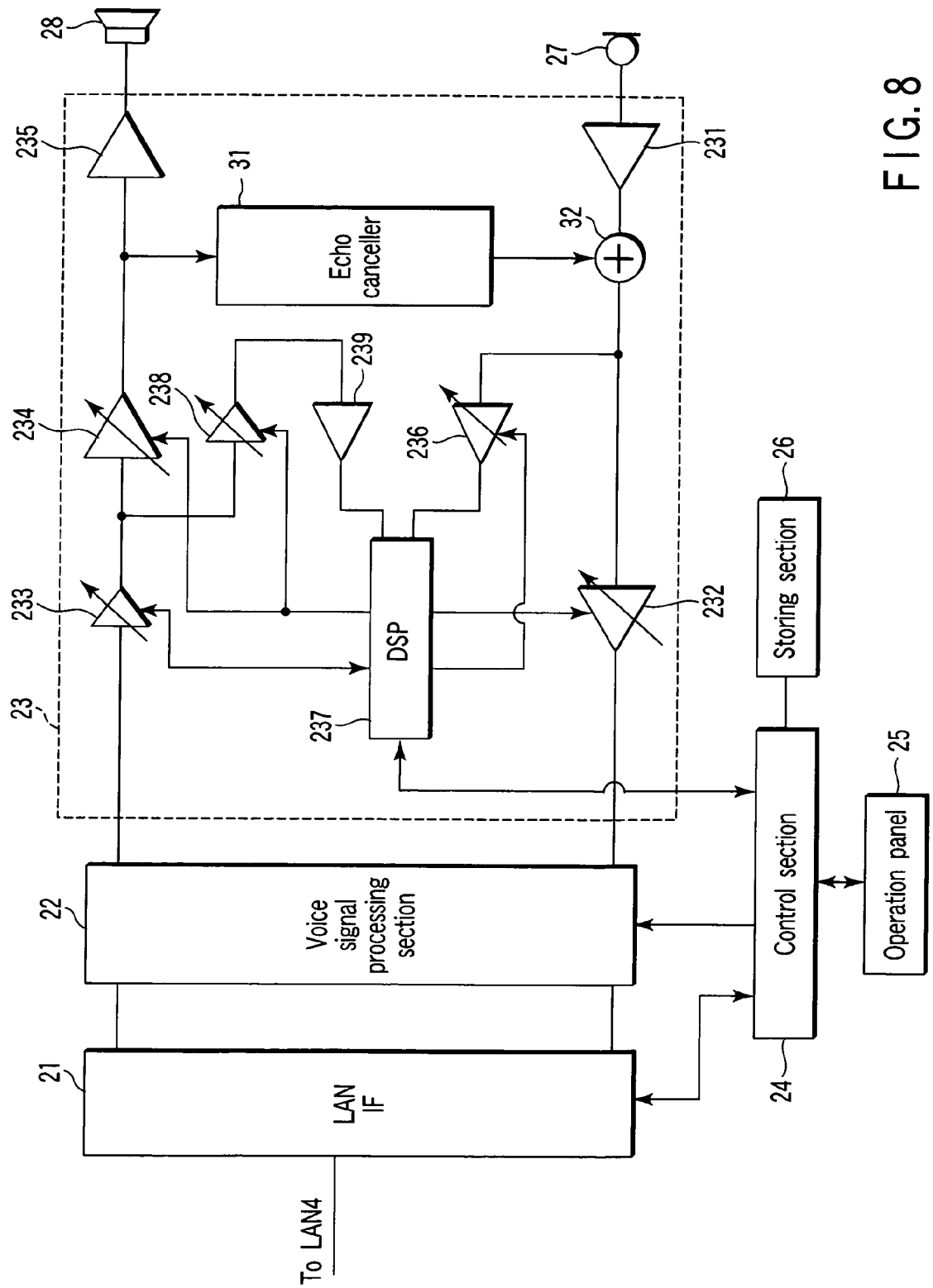
F I G. 8

TELEPHONE TERMINAL, TELEPHONE SYSTEM USING TELEPHONE TERMINAL AND CONTROL METHOD OF TELEPHONE TERMINAL

CROSS-REFERENCE TO RELATED APPLICATIONS

This application is based upon and claims the benefit of priority from prior Japanese Patent Application No. 2004-288891, filed Sep. 30, 2004, the entire contents of which are incorporated herein by reference.

BACKGROUND OF THE INVENTION

1. Field of the Invention

The present invention relates to a telephone terminal, a telephone system using this telephone terminal and a control method of the telephone terminal capable of connecting to a local area network (LAN) transmitting, e.g., a voice packet.

2. Description of the Related Art

In recent years, a system, enabling communications among Internet protocol (IP) telephone terminals and between the IP telephone terminal and an external communication network such as a public network, by connecting the IP telephone terminals equipped with a communication processing function and a media information processing function to the LAN, connecting the LAN to the external communication network via a main device and conducting protocol conversion and data format conversion through the IP telephone terminal and the main device, has been proposed.

By the way, in such a kind of system, a signal creep is added to a voice signal when the IP telephone terminal is connected to an analog line or a private line. When the IP telephone terminal makes a loud speakerphone communication in a room with a high level acoustic echo, a handset on a communication partner hears an anxious echo.

In the case of the IP telephone terminal, further, sometimes occurs a delay resulted from a network, which seldom occurs in the case of a conventional telephone set. When the delay occurs, the voice which is talked though a partner side handset creeps on a speakerphone side as the acoustic echo and an abnormal noise and an echo sound are heard during talking and when it is terminated on the handset side and harsh sounds are caused. In particular, an anxious degree tends to become increased in proportion to a length of a delay amount, so that when the delay amount becomes large, an echo amount should be further reduced.

Therefore, it is considered to provide an echo canceller function for deleting the acoustic echo to be added to the voice signal to the main device (for example, U.S. Pat. No. 6,404,887, B1).

In the meanwhile, the above-mentioned echo canceller function effectively operates in the case of connection between the IP telephone terminal and an office lime, but in the case of mutual connection of IP telephone terminals with less affects by creeping (peer-to-peer), the function becomes unstable inversely.

BRIEF SUMMARY OF THE INVENTION

An object of the present invention is to provide a telephone terminal capable of effectively suppressing an acoustic echo without deteriorating switching performance from a receiving state to a transmitting state even when it is used in a room with a high level acoustic echo, a telephone system using this telephone terminal and a control method of the telephone terminal.

According to an aspect of the present invention, there is provided a telephone terminal for use in a telephone system equipped with a main device for performing a line exchange and a plurality of telephone terminals which are connected to the main device via cable lines, transmit a voice signal to the main device and receives it transmitted from the main device to acoustically reproduce it, comprising: a receiving detector which detects a signal level of a receiving voice signal incoming from the main device; a transmitting detector which detects a signal level of a transmitting voice signal to transmit it to the main device; an adjustment device configured to adjust the transmitting voice signal; and a controller which obtains a control value capable of switching a communication state from a receiving state to a transmitting state to make an acoustic echo to be added to the transmitting voice signal be minimum, based on each a detection result of the receiving detector and a detection result of the transmitting detector, and controls the adjustment device based on the control value.

According to another aspect of the present invention, there is provided a telephone system equipped with a main device for performing a line exchange and a plurality of telephone terminals which are connected to the main device via a cable line, transmits a voice signal to the main device and receives it transmitted from the main device to acoustically reproduce it, wherein each of the telephone terminals comprises: a receiving detector which detects a signal level of a receiving voice signal incoming from the main device; a transmitting detector which detects a signal level of a transmitting voice signal to transmit it to the main device; an adjustment device configured to adjust the transmitting voice signal; and a controller which obtains a control value capable of switching a communication state from a receiving state to a transmitting state to make an acoustic echo to be added to the transmitting voice signal be minimum based on each a detection result of the receiving detector and a detection result of the transmitting detector, and controls the adjustment device based on the control value.

According to yet another aspect of the present invention, there is provided a control method of a telephone terminal for use in a telephone system equipped with a main device for performing a line exchange and a plurality of telephone terminals which are connected to the main device via a cable line, transmits a voice signal to the main device and receives it transmitted from the main device to acoustically reproduce it, comprising: detecting a signal level of a receiving voice signal incoming from the main device; detecting a signal level of a transmitting voice signal to transmit it to the main device; obtaining a control value capable of switching a communication state from a receiving state to a transmitting state to make an acoustic echo to be added to the transmitting voice signal be minimum based on each signal level of the receiving voice signal and signal level of the transmitting voice signal; and adjusting to control the transmitting voice signal based on the control value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing an example of a stored content of a storing section shown in FIG. 2;

FIG. 4 is a view showing a switching property between a transmitting state and a receiving state in the first embodiment of the present invention;

FIG. 5 is a view for explaining an example to cause a delay resulting from transmission through a LAN;

FIG. 8 is a block diagram showing a functional configuration of an IP telephone terminal in a second embodiment of the present invention.

DETAILED DESCRIPTION OF THE INVENTION

Hereinafter embodiments of the present invention will be explained by referring to drawings in detail.

First Embodiment

Figure 1:
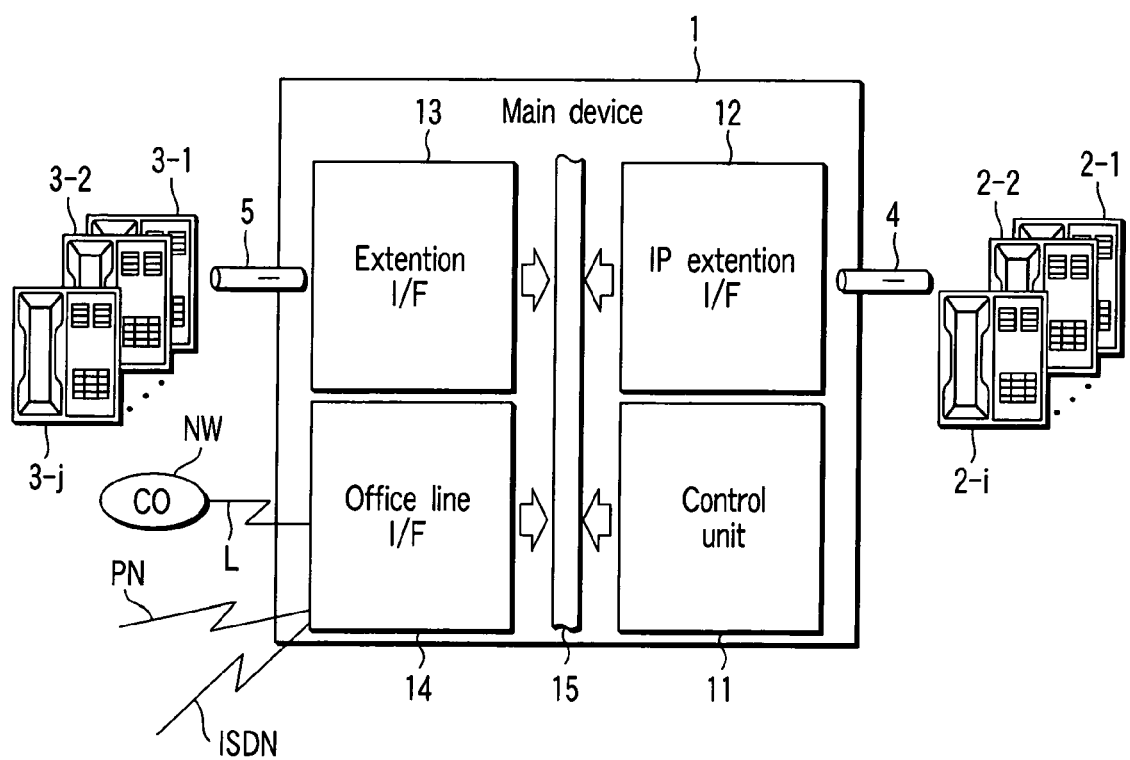
FIG. 1 is a view showing a schematic configuration of an exchange system regarding a first embodiment of the present invention.

FIG. 1 is the view showing the schematic configuration of the exchange system regarding the first embodiment of the present invention.

The exchange system is configured, as shown in FIG. 1, to arbitrarily connect a plurality of IP telephone terminals 2 (2-1 to 2-i) to a main device 1 via a LAN 4, respectively, and arbitrarily connect a plurality of telephone terminals 3 (3-1 to 3-j) to the main device 1 via an analog extension 5, respectively.

The main device 1 further comprises a control unit 11, an IP extension interface (I/F) circuit 12, an extension I/F circuit 13 and an office line I/F circuit 14. The control unit 11, IP extension I/F 12, extension I/F 13 and office line I/F 14 are connected via a bus 15 with one another.

The control unit 11 arbitrarily exchanges to connect these I/Fs 12, 13 and 14.

IP telephone terminals 2 are connected to the IP extension I/F 12 if necessary. The IP extension I/F 12 performs extension I/F operations relating to the IP telephone terminals 2 connected thereto. The IP extension I/F 12 performs transmitting and receiving of a variety of items of control information in relation to the extension I/F operations to and from the control unit 11 via the bus 15.

Telephone terminals 3 are connected to the extension I/F 13 if necessary. The extension I/F 13 performs extension I/F operations relating to the telephone terminals 3 connected thereto. The extension I/F 13 performs transmitting and receiving of a variety of items of control information in relation to the extension I/F operations to and from the control unit 11 via the bus 15.

An office line L is connected to a public network NW, a private line PN and an ISDN if necessary. The office line I/F 14 performs I/F operations in relation to the connected office line L, the private line PN and the ISDN. The office line I/F 14 performs transmitting and receiving of a variety of items of control information in relation to the I/F operations to and from the control unit 11 via the bus 15.

Figure 2:
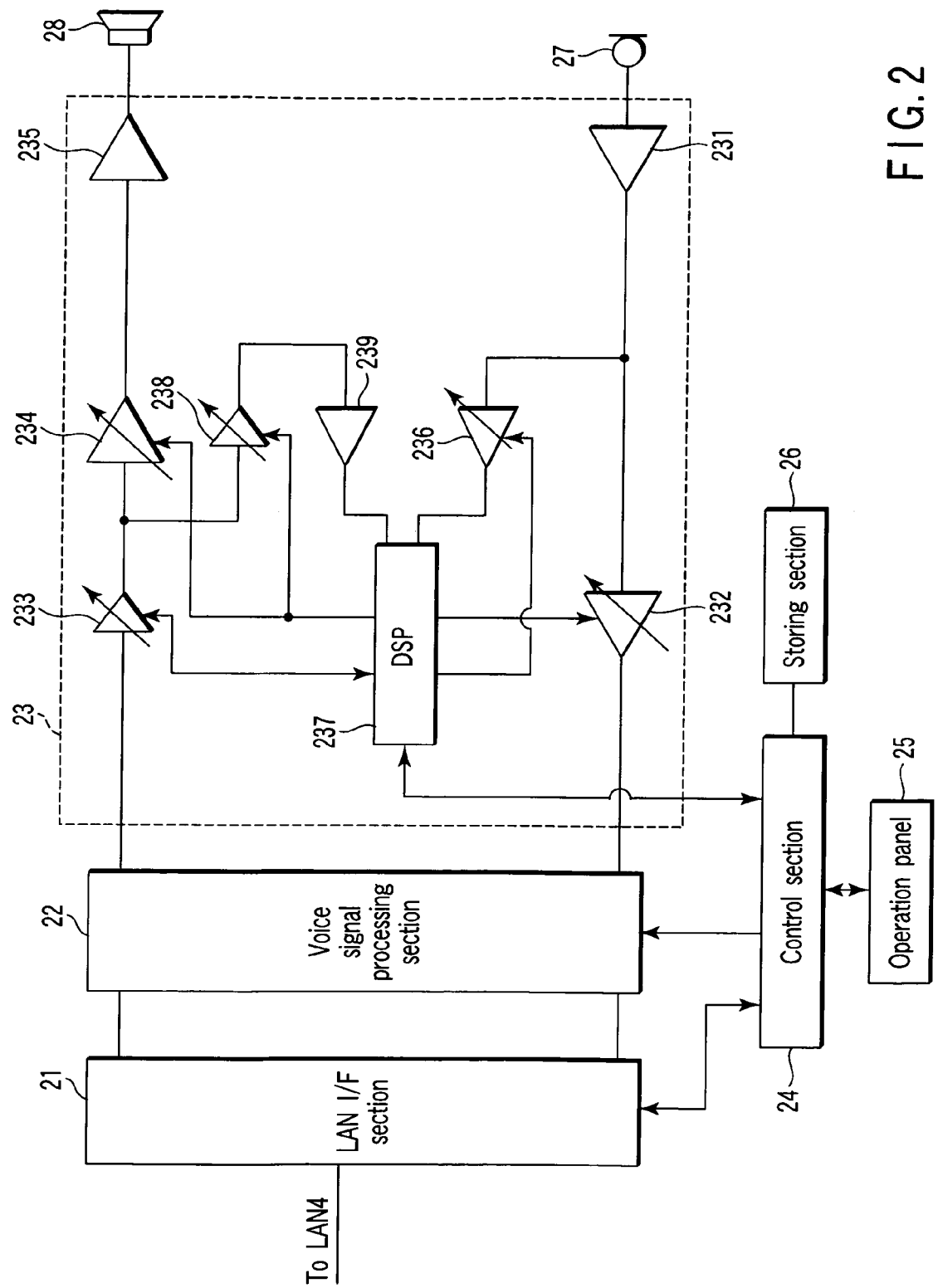
FIG. 2 is a block diagram showing a functional configuration of an IP telephone terminal in the first embodiment of the present invention.

FIG. 2 is the block diagram showing the functional configuration of the IP telephone terminal 2 regarding the present invention.

The IP telephone terminal 2 comprises a LAN I/F section 21, a voice signal processing section 22, a voice input/output I/F section 23, a control section 24, an operation panel and a storing section 26.

The LAN I/F section 21 performs I/F operations relating to the LAN 4. That is, the LAN I/F section 21 extracts a voice packet and control data from a transmission packet transmitted through the LAN 4 to supply the voice packet to the voice signal processing section 22 and the control data to the control section 24.

The voice signal processing section 22 converts the voce packet supplied from the LAN I/F section 21 into an analog receiving voice signal to supply it to the voice input/output I/F section 23. The voice signal processing section 22 converts a transmitting voice signal input from the voice input/output I/F section 23 into a voice packet capable of being processed in the LAN 4 to supply it to the LAN I/F section 21.

A microphone 27 and a loud speaker 28 are connected to the voice input/output I/F section 23. In the voice input/output I/F section 23, a microphone amplifier 231 amplifies the transmitting voice signal being input from the microphone 27 by prescribed level, and after converting the amplified transmitting voice signal into an arbitrary loss level thereof by a transmitting variable loss device 232, the amplified transmitting voice signal is input to the voice signal processing section 22. The voice input/output I/F section 23 converts the receiving voice signal being output from the voice signal processing section 22 into an appropriate voice amount level thereof by a loud speaker volume controller 233, and after converting the converted receiving voice signal into an arbitrarily loss level thereof by a receiving variable loss device 234, the converted receiving voice signal is amplified by a loud speaker amplifier 235 to acoustically reproduce from a loud speaker 28.

On the other hand, a transmitting detector 236 detects an output from the microphone amplifier 231 at an arbitrary detection gain to supply it to a digital signal processor (DSP) 237. A detection variable loss device 238 amplifies the output from the loud speaker volume controller 233 at the same loss level as that of the variable loss device 234, and a receiving detector 239 detects the output from the variable loss device 238 to supply it to the DSP 237.

The DSP 237 compares the output from the transmitting detector 236 with the output from the receiving detector 239 to determine a switching time point from the receiving state to the transmitting state and obtains a transmitting detection gain value corresponding to a sound volume value of the volume controller 233 through the communication with the control section 24 to control the detection gain of the transmitting detector 236 based on this gain value.

The operation panel 25 has a key switch to accept a variety of instruction inputs from a user to the control section 24.

The storing section 26 stores a table indicating a correspondence relation between the sound volume value of the volume controller 233 and the transmitting detection gain value, as shown in FIG. 3. This correspondence relation is predetermined based on a signal property shown in FIG. 4.

The control section 24 performs control of each section of the telephone terminals 2 and communication processing between the LAN 4 though software processing. The control section 24 makes the DSP 237 adjust the sound volume value of the volume controller 233 to a set volume value, when sound volume value setting from the user is accepted though the operation panel 25. Further, the control section 24 reads out the transmitting detection gain value corresponding to the sound volume value being set at the volume controller 233 when an obtaining instruction of the transmitting detection gain value is given from the DSP 237 to output this gain value to the DSP 237.

Next, in the above-described configuration, hereinafter, its processing operations will be explained by referring to FIG. 5 and FIG. 6.

For example, it is assumed that a communication is conducted between the IP telephone terminal 2-1 and the telephone terminal 3-1.

Here, in the case that the IP telephone terminal 2-1 is used in the room with the acoustic echo and a speakerphone communication is performed, the transmitting voice signal to be input to the microphone 27 achieves the user of the telephone terminal 3-1 after a delay of 400 ms-600 ms, as shown in FIG. 5(*b*) resulting form a delay of one side of 200 ms-300 ms, as shown in FIG. 5(*a*). Accordingly, an echo sound caused by a sound at the speakerphone is heard as a hashed noise and brings the user into extreme discomfort in comparison with a communication through a conventional line without a delay. If the volume controller 233 is adjusted to increase the sound volume of the transmitting voice signal, the echo sound is increased.

In this first embodiment, the storing section 26 stores the transmitting detection gain value corresponding to the sound volume value being set at the volume controller 233, enabling the communication state to be switched from the receiving state to the transmitting state and making the acoustic echo be minimum. And when the volume controller 233 is set to an arbitrary sound volume value by the control section 24 and the DSP 237, the gain of the transmitting detection circuit 236 corresponding to the set sound volume value is read out from the storing section 26 to be controlled in accordance therewith.

Figure 6:
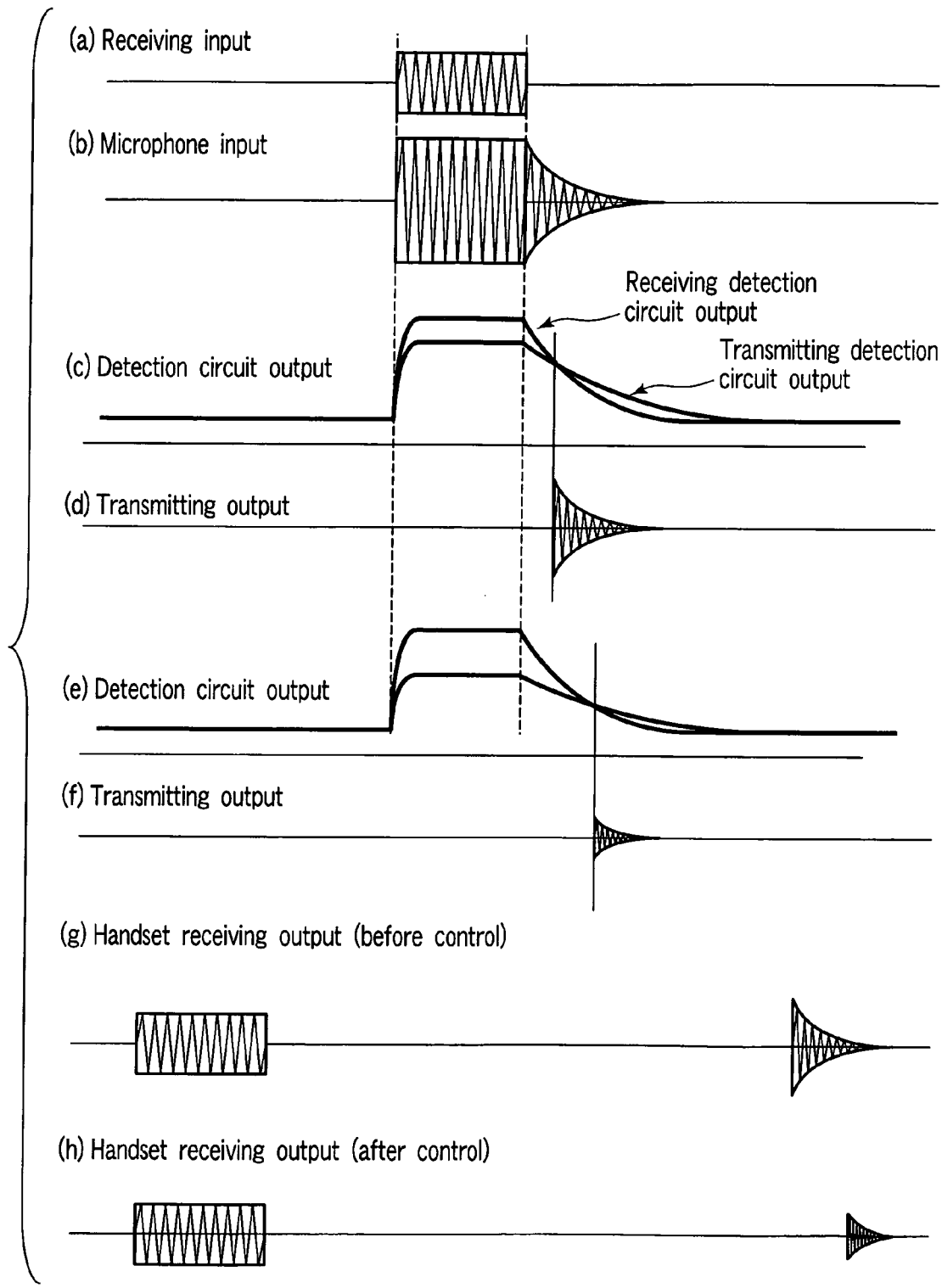
FIG. 6 is a view of signal waveforms for explaining processing operations of the IP telephone terminal in the first embodiment of the present invention.

The output from the volume controller 233 becomes a signal shown in FIG. 6(*a*) and the transmitting voice signal being input to the microphone 27 becomes a signal shown in FIG. 6(*b*).

The output from the transmitting detection circuit 236 and the output from the receiving detection circuit 239 are supplied to the DSP 237, as shown in FIG. 6(*c*). The DSP 237 compares the output from the transmitting detection circuit 236 with the output from the receiving detection circuit 239 and determines the switching time point from the receiving state to the transmitting state and the switching time point from the transmitting state to the receiving state to control the loss level of the transmitting variable loss device 232 based on the determination results. Thus, the transmitting variable loss device 232 outputs a signal shown in FIG. 6(*d*). However, in this transmitting voice signal, the acoustic echo is increased.

Therefore, if the DSP 237 sets the transmitting detection gain value corresponding to the set sound volume value at the volume controller 233 to the transmitting detector 236, a signal shown in FIG. 6(*e*) is obtained from the transmitting detector 236 and the receiving detector 239. The DSP 237 determines the switching time point from the receiving state to the transmitting state to control the loss level of the transmitting variable loss device 232 based on this determination result, then, the transmitting variable loss device 232 outputs a signal shown in FIG. 6(*f*).

Consequently, the receiving voice signal to be heard on the communication partner is improved from a signal shown in FIG. 6(*g*) to a signal shown in FIG. 6(*h*).

Figure 7:
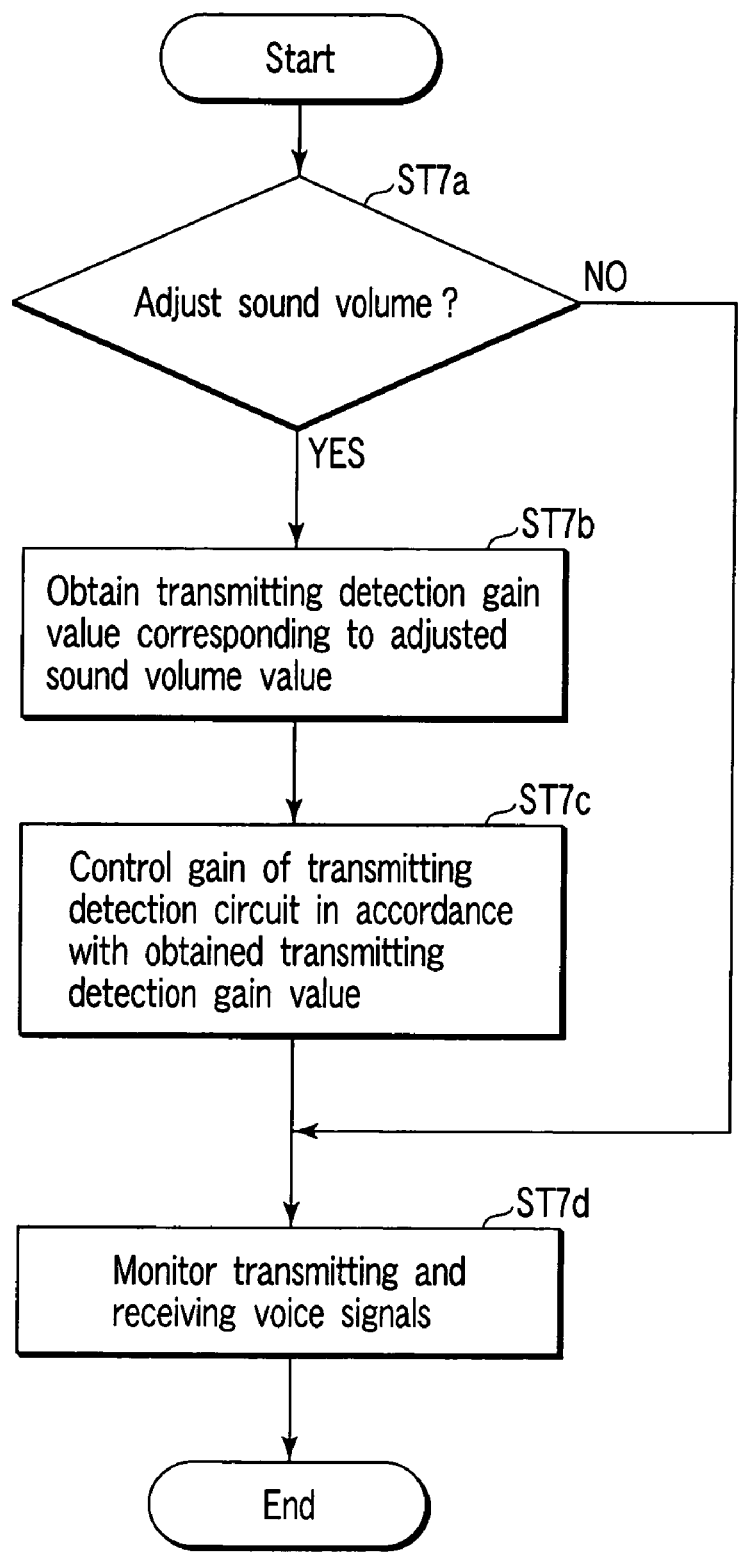
FIG. 7 is a flowchart showing the processing operations of the IP telephone terminal in the first embodiment of the present terminal.

At this time, the DSP 237 executes control processing shown in FIG. 7.

At first, the DSP 237 determines whether or not sound volume adjustment for the loud speaker volume controller 233 is performed by the user (step ST7*a*), if the adjustment is performed (Yes, in step ST7*a*), the DSP 237 obtains the transmitting detection gain value corresponding to the adjusted sound volume value from the control section 24 (step ST7*b*). The DSP 237 controls the gain at the transmitting detection circuit 236 in accordance with the obtained transmitting detection gain value (step ST7*c*) to monitor the output from the transmitting detector 236 and the receiving detector 239 (step ST7*d*).

At this moment, when an attenuation amount of the acoustic echo to be added to the transmitting voice signal is known in advance, if the DSP 237 controls the gain of the transmitting detector 236 so as to switch the loss level of the transmitting variable loss device 232 at the time point of attenuation of an echo amount by 40 dB-50 dB, the DSP 237 can further reduce the acoustic echo to be added to the output from the transmitting variable loss device 232.

In the step ST7*a*, if the sound volume adjustment of the volume controller 233 is not performed (No, in step ST7*a*), the DSP 237 shifts to the processing in the step ST7*d* without performing the sound volume adjustment.

As stated above, in the first embodiment, the transmitting detection gain value, corresponding to the sound volume value being set by the volume controller 233, being possible to be switched from the receiving state to the transmitting state and making the acoustic echo be minimum is stored in the storing section 26 in advance. And when the volume controller 233 is set to the arbitrary sound volume value by the control section 24 and the DSP 237, the transmitting detection gain value corresponding to this sound volume value is read out form the storing section 26 and the gain at the transmitting detector 236 is controlled in accordance with this gain value.

Accordingly, if the user uses the IP telephone terminal 2 at the place tending to be affected by the acoustic echo, the deterioration in the switching performance from the receiving state to the transmitting state can be suppressed at a minimum and the acoustic echo can be suppressed at a minimum during transmitting. Since the IP telephone terminal 2 has a function to suppress the acoustic echo, it becomes no need to provide an echo canceller at the main device 1, thereby, a processing burden on the main device 1 can be reduced.

And in the above-stated first embodiment, since the storing section 26 stores the table indicating the correspondence relation between the sound volume value and the transmitting detection gain value, the processing to suppress the acoustic echo to be added to the transmitting voice signal can be conducted with simple procedures.

Second Embodiment

FIG. 8 is the block diagram showing the functional configuration of an IP telephone terminal 2 in the second embodiment of the present invention. In FIG. 8, the same parts as those of FIG. 2 are put the same reference marks and the detail explanation will be eliminated.

Otherwise stated, an echo canceller 31 and an adder 32 are interposed between an input side of the loud speaker amplifier 235 and an output side of the microphone amplifier 231.

The echo canceller 31 inputs an output signal from the receiving variable loss device 234 to produce a signal to delete an acoustic echo to be added to the output signal from this input signal to the microphone amplifier 231. The output signal from the echo canceller 31 is added to the output signal from the microphone amplifier 231 at the adder 32, so that the output signal can further reduce the acoustic echo to be added to the transmitting voice signal.

As mentioned above, in the second embodiment, the transmitting variable loss device 232 performs the processing to control the acoustic echo after the echo canceller 31 cancels the acoustic echo to be added to the transmitting voice signal, so that the acoustic echo to be added to the transmitting voice signal can be further reduced.

Other Embodiment

It is to be understood that the present invention is not limited to each of the above-described embodiments. For example, though each of the above-mentioned embodiments has been explained in the example in which the transmitting detection gain value corresponding to the sound volume value is stored in the storing section. However, the present invention is not limited to the specific embodiments thereof, any invention possible to obtain the transmitting detection gain value from the correspondence relationship between the signal level of the receiving voice signal and the signal level of the transmitting voice signal may be configured to obtain the transmitting detection gain value from the outputs from the receiving detector and from transmitting detector and control the gain from at the transmitting detector. It is also possible to obtain the transmitting detection gain value only from the output from the receiving detector and control the gain at the transmitting detector.

In each of the above-described embodiment, the IP telephone terminal connected to the LAN has been explained as the sample. However; the present invention is not limited to this example, the present invention can be applied to an analog telephone terminal connected to an analog line. In this case, it is possible for restraint processing of the acoustic echo to be effectively performed in the room with a high level acoustic echo.

Other than this embodiment, constitutions or kinds of a system, constitutions or kinds of a main device, constitutions of the IP telephone terminal, suppressing procedures for the acoustic echo to be added to the transmitting voice signal, etc., can be established with a variety of modifications without departing from the spirit or scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A telephone terminal for use in a telephone system equipped with a main device for performing a line exchange and a plurality of telephone terminals which are connected to the main device via cable lines, transmit a voice signal to the main device and receives it transmitted from the main device to acoustically reproduce it, comprising:
   a receiving detector which detects a signal level of a receiving voice signal incoming from the main device;
   a transmitting detector which detects a signal level of a transmitting voice signal to transmit it to the main device;
   an adjustment device configured to adjust the transmitting voice signal; and
   a controller which obtains a control value capable of switching a communication state from a receiving state to a transmitting state to make an acoustic echo to be added to the transmitting voice signal be minimum, based on each a detection result of the receiving detector and a detection result of the transmitting detector, and controls the adjustment device based on the control value.

2. The telephone terminal according to claim 1, wherein the controller includes a memory which stores a table indicating a correspondence relation between a receiving system gain and the control value, reads out a control value corresponding to a detection result of the receiving detector and a detection result of the transmitting detector as the receiving system gain.

3. The telephone terminal according to claim 2, wherein the adjustment device includes a transmitting variable loss device configured to outputs the transmitting voice signal at an arbitrary loss level, and
   the controller comprises;
   a loss controller which compares an output from the receiving detector with an output from the transmitting detector to control a loss level of the transmitting variable loss device based on the comparison result; and
   a gain controller which controls a detected gain of the transmitting detector based on the control value read out from the table.

4. The telephone terminal according to claim 3, wherein the gain controller controls the detected gain of the transmitting detector to switch the loss level of the transmitting variable loss device at the time when an acoustic echo amount to be added to the transmitting voice signal is attenuated by a prescribed amount.

5. The telephone terminal according to claim 1 further comprises: a converter which converts a voice packet transmitted from the main device into the receiving voice signal and converting the transmitting voice signal into a voice packet to transmit them to the main device, when the telephone terminal is connected to the main device via a communication network for a packet transmission.

6. The telephone terminal according to claim 1 further comprises an echo canceller which deletes the acoustic echo to be added to the transmitting voice signal before the transmitting voice signal is input to the adjustment device.

7. A telephone system equipped with a main device for performing a line exchange and a plurality of telephone terminals which are connected to the main device via a cable line, transmits a voice signal to the main device and receives it transmitted from the main device to acoustically reproduce it, wherein each of the telephone terminals comprises:
   a receiving detector which detects a signal level of a receiving voice signal incoming from the main device;
   a transmitting detector which detects a signal level of a transmitting voice signal to transmit it to the main device;
   an adjustment device configured to adjust the transmitting voice signal; and a controller which obtains a control value capable of switching a communication state from a receiving state to a transmitting state to make an acoustic echo to be added to the transmitting voice signal be minimum based on each a detection result of the receiving detector and a detection result of the transmitting detector, and controls the adjustment device based on the control value.

8. A control method of a telephone terminal for use in a telephone system equipped with a main device for performing a line exchange and a plurality of telephone terminals which are connected to the main device via a cable line, transmits a voice signal to the main device and receives it transmitted from the main device to acoustically reproduce it, comprising:

detecting a signal level of a receiving voice signal incoming from the main device;

detecting a signal level of a transmitting voice signal to transmit it to the main device;

obtaining a control value capable of switching a communication state from a receiving state to a transmitting state to make an acoustic echo to be added to the transmitting voice signal be minimum based on each signal level of the receiving voice signal and signal level of the transmitting voice signal; and adjusting to control the transmitting voice signal based on the control value.

* * * * *

UNITED STATES PATENT AND TRADEMARK OFFICE
CERTIFICATE OF CORRECTION

PATENT NO. : 7,480,262 B2  Page 1 of 1
APPLICATION NO. : 11/239313
DATED : January 20, 2009
INVENTOR(S) : Horiuchi et al.

It is certified that error appears in the above-identified patent and that said Letters Patent is hereby corrected as shown below:

Claim 3, column 8, line 27, change "outputs" to --output--.

Claim 3, column 8, line 29, change "comprises;" to --comprises:--.

Signed and Sealed this

Seventh Day of April, 2009

JOHN DOLL
*Acting Director of the United States Patent and Trademark Office*